(12) United States Patent
Calvert

(10) Patent No.: US 8,590,909 B2
(45) Date of Patent: Nov. 26, 2013

(54) WHEELIE BAR FOR LEAF SPRING EQUIPPED CARS

(76) Inventor: John Calvert, Lancaster, CA (US)

( * ) Notice: Subject to any disclaimer, the term of this patent is extended or adjusted under 35 U.S.C. 154(b) by 33 days.

(21) Appl. No.: 13/441,661

(22) Filed: Apr. 6, 2012

(65) Prior Publication Data

US 2013/0264805 A1 Oct. 10, 2013

(51) Int. Cl.
*B62D 61/12* (2006.01)
*B60G 11/113* (2006.01)

(52) U.S. Cl.
USPC ............ 280/124.104; 280/755; 280/767; 280/124.153; 280/296

(58) Field of Classification Search
CPC .................................................. B60G 11/113
USPC ............ 280/124.104, 755, 767, 124.153, 296
See application file for complete search history.

(56) References Cited

U.S. PATENT DOCUMENTS

| | | | |
|---|---|---|---|
| 1,478,428 A | 12/1923 | Duncan | |
| 3,277,975 A | 10/1966 | Van Winsen | |
| 3,523,697 A | 8/1970 | O'Sullivan | |
| 3,757,459 A | 9/1973 | Buck et al. | |
| 4,007,949 A | 2/1977 | Norcia et al. | |
| 4,098,523 A | 7/1978 | Valerio | |
| 4,108,267 A | 8/1978 | Valerio | |
| 4,153,268 A * | 5/1979 | Wilson et al. | 280/296 |
| 4,274,656 A | 6/1981 | Warren | |
| 4,353,571 A * | 10/1982 | Anderson | 280/295 |
| 4,522,420 A | 6/1985 | Hannappel | |
| 4,772,037 A | 9/1988 | Jones | |
| 4,813,702 A | 3/1989 | Arai et al. | |
| 4,988,120 A | 1/1991 | Jones | |
| 5,123,672 A | 6/1992 | Walton et al. | |
| 5,242,183 A | 9/1993 | Oberg et al. | |
| 5,354,092 A | 10/1994 | Calvert | |
| D366,636 S * | 1/1996 | Smith | D12/114 |
| D394,033 S * | 5/1998 | Pingel et al. | D12/114 |
| 5,938,238 A * | 8/1999 | Lamb | 280/755 |
| 6,423,914 B1 | 7/2002 | Burnett | |
| 7,048,285 B1 | 5/2006 | Yates | |
| 7,578,721 B1 | 8/2009 | Allmendinger | |
| 8,075,011 B1 * | 12/2011 | Duzzny | 280/293 |

* cited by examiner

*Primary Examiner* — Karen Beck
(74) *Attorney, Agent, or Firm* — David A. Belasco; Belasco Jacobs & Townsley, LLP

(57) ABSTRACT

A wheelie bar for leaf spring equipped cars includes first and second mounting brackets each having at least one attachment point and one bearing feature. First and second lower side members are pivotally mounted to the mounting brackets. A ground wheel is rotatably mounted to ends of the lower side members. First and second upper side members are pivotally mounted to the mounting brackets and fixedly attached to the lower side members. A vehicle bearing wheel is rotatably mounted to opposite ends of the first and second upper side members. Bearings are provided. A rear support member connects the upper side members and distal ends of the lower side members. At least one elevating facility urges the first and second lower side members upwardly toward an underside of a car. The attachment points have arcuate front ends and are fixedly attached to an axle housing of the car by welding.

18 Claims, 3 Drawing Sheets

WHEELIE BAR FOR LEAF SPRING EQUIPPED CARS

FIELD OF INVENTION

This invention relates to the field of automobile drag racing and more specifically to equipment designed to prevent drag racing automobiles from tilting at too great an angle under hard acceleration.

BACKGROUND OF THE INVENTION

The Stock Eliminator class of drag racing automobiles typically involves conventional sedan or similar production vehicles that have been substantially modified with larger engines, drag racing tires, suspension upgrades and body reinforcements. These cars have become sufficiently powerful and have sufficient traction that they tend to "do a wheelie" during hard acceleration. This causes the front of the car to lift off of the roadway, resulting in a loss of visibility and directional control for the driver. In order to control this unwanted lifting of the front of the car, wheelie bars have been developed that attached to the car and bear on the roadway during acceleration.

Typically the wheelie bar is a frame-like device that attaches to the vehicle suspension and includes one or more small wheels at its distal end. These small wheels bear on the road as the vehicle accelerates and they prevent the vehicle from rotating about its rear axle. The stresses that a wheelie bar places on the vehicle suspension can be substantial. This is a particular problem for leaf spring equipped cars if the wheelie bar is attached to the leaf springs or their mounting brackets where they attach to the vehicle. These mounting brackets can unbend or break under hard acceleration, causing severe damage to the vehicle and potential hazards to the driver. The present invention addresses this problem.

A number of inventions have been developed for the attachment of wheelie bars to vehicles. U.S. Pat. No. 4,988,120, issued to Jones is directed to a chassis system for a race vehicle with wheelie bars. The wheelie bar is connected to the axle bracket below the center of the axle bracket hole and to frame structure rearward of the rear wheel by a third connecting member. The wheelie wheel is connected to the rearward end of wheelie bar for contact with the ground when the acceleration of the vehicle is sufficient to cause the front wheels of the vehicle to lift. An axle bracket is also connected to frame structure by means of coil spring/shock absorbers.

U.S. Pat. No. 7,578,721, issued to Allmendinger is directed to a wheelie bar apparatus for a model vehicle. The wheelie bar is supported on the chassis of the vehicle and may be installed and removed without the use of separate fasteners or tools. The wheelie bar comprises one or more fasteners for securing the extension to the chassis. In a first embodiment, a clip engages a bumper and is held against the bumper by the spring action of a resilient skid plate. The wheelie bar may control the extent of vehicle wheelies by contacting a surface underlying the vehicle and resisting the wheelie of the vehicle. Other embodiments provide for the attachment of the wheelie bar to be made to various locations such as bottom cross bar, top cross bar, or a rod positioned along the center line of the vehicle as the structural feature for supporting the wheelie bar vehicle extension A bearing element may be secured to or formed on a bearing support for contacting a surface underlying the vehicle during a wheelie and this bearing element may be a skid, runner, plate, or roller.

U.S. Pat. No. 5,938,238, issued to Lamb illustrates a pneumatic lift control device which is used to control the amount of front end lift of an automobile during acceleration. The embodiment shown comprises a lift control device which attaches to rear chassis and frame structure by means of tube and tension member. The lift control device extends to wheels and responds during acceleration to the lifting of the front end of the car by placement of the wheels against the ground in response thereto.

U.S. Pat. No. 4,772,037, issued to Jones is directed to a device for the prevention of vehicular overturn of all terrain vehicles. The ATV is stabilized against backward overturn by means of a tire which is attached to the vehicle by means of vertical bracket, bars, and an upper bar, which are secured by screws or bolts. In a second embodiment the fastener bracket is attached to one end of a shock absorber to accomplish the same stabilization function.

U.S. Pat. No. 4,274,656, issued to Warren is directed to an apparatus for preventing vehicles from slipping sideways and going out of control under snow and ice conditions. The device includes a pair of wheels which bear against road surface and is attached to the vehicle at the rear axle by means of U-bolts.

It is an objective of the present invention to provide a wheelie bar that can be securely attached to a leaf spring equipped vehicle. It is a further objective to provide a wheelie bar that does not attach to the leaf springs or spring mounts of the vehicle. It is a still further objective of the invention to provide a wheelie bar that does not attach to the body or chassis of the vehicle. It is yet a further objective to a wheelie bar that is flexibly mounted to the vehicle. Finally, it is an objective of the present invention to a wheelie bar that is durable, inexpensive, easy to maintain and simple to use.

While some of the objectives of the present invention are disclosed in the prior art, none of the inventions found include all of the requirements identified.

SUMMARY OF THE INVENTION

The present invention addresses all of the deficiencies of prior art wheelie bars for leaf spring equipped vehicles and satisfies all of the objectives described above.

(1) A wheelie bar for leaf spring equipped cars providing the desired features may be constructed from the following components. First and second mounting brackets are provided. Each of the brackets has at least one attachment point and at least one bearing feature. First and second lower side members are provided. Each of the lower side members, has anterior and posterior ends and is pivotally mounted adjacent the anterior ends to the first and second mounting brackets, respectively. A ground wheel is provided. The ground wheel is rotatably mounted adjacent the posterior ends of the first and second lower side members. First and second upper side members are provided. Each of the upper side members has leading and trailing ends and is pivotally mounted adjacent the leading ends to the first and second mounting brackets and fixedly attached adjacent the anterior ends of the first and second lower side members.

A vehicle bearing wheel is provided. The bearing wheel is rotatably mounted adjacent the trailing ends of the first and second upper side members. A rear support member is provided. The support member has a forward end and a back end. The support member is fixedly attached adjacent the forward end adjacent the trailing ends of the first and second upper side members. The support member is fixedly attached adjacent the back end adjacent the posterior ends of the first and second lower side members. At least one elevating facility is provided. The facility urges the wheelie bar upwardly toward an underside of a car. The attachment points are fixedly attached to an axle housing of a car.

(2) In a variant of the invention, the first and second mounting brackets further include first and second parallel side plates. Each of the side plates has a front end and a rear end, one of the attachment points is located adjacent the front end and one of the bearing features is spaced from the attachment point.

(3) In another variant, at least one elevating facility mounting is provided. The mounting is fixedly joined to at least one of the side plates adjacent the rear end.

(4) In still another variant, first and second bearings are mounted to the bearing features of the first and second parallel side plates.

(5) In yet another variant, the at least one attachment point has an arcuate shape. The shape corresponds to a shape of an exterior surface of the axle housing of the car.

(6) In a further variant, the at least one attachment point is attached to the axle housing of the car by welding.

(7) In still a further variant, the elevating facility further includes a coil spring. The coil spring is located between the elevating facility mounting and at least one of the first and second lower side members.

(8) In yet a further variant, the elevating facility further includes a coil spring receiver. The receiver is fixedly attached to at least one of the first and second lower side members and is sized and shaped to at least partially surround an upper end of the coil spring.

(9) In another variant of the invention, the elevating facility further includes a coil spring seat. The seat is attached to the elevating facility mounting and is sized and shaped to at least partially surround a lower end of the coil spring.

(10) In still another variant of the invention, the seat is adjustably attached to the elevating facility mounting, thereby controlling tension on the coil spring.

(11) In yet another variant, the seat is threadedly attached to the elevating facility mounting and secured with a locking fastener.

(12) In a further variant, the elevating facility includes an elastic member. The elastic member is located between the underside of the car and at least one of the first and second upper side members.

(13) In yet a further variant, a shock absorber is provided. The shock absorber is located between at least one of the first and second mounting brackets and at least one of the first and second lower side members.

(14) In still a further variant, the shock absorber is formed of resilient material.

(15) In another variant, the ground wheel is rotatably mounted adjacent the posterior ends of the first and second lower side members and the back end of the rear support member with a bearing. The bearing reduces friction as the ground wheel contacts a ground surface.

(16) In yet another variant, the vehicle bearing wheel is rotatably mounted adjacent the trailing ends of the first and second upper side members and the forward end of the rear support member with a bearing. The bearing reduces friction as the vehicle bearing wheel contacts the underside of the car.

(17) In still another variant of the invention, a reinforcing plate is provided. The reinforcing plate is formed of semi-rigid material and is sized shaped and located to provide a bearing surface between the vehicle bearing wheel and an underside of the car.

(18) In a final variant, the reinforcing plate is formed of material selected from the group that includes steel, brass, aluminum, plastic, rubber and leather.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1-5 illustrate a wheelie bar for leaf spring equipped cars 10 providing the desired features that may be constructed from the following components. First 14 and second 18 mounting brackets are provided. Each of the brackets 14, 18 has at least one attachment point 22 and at least one bearing feature 26. First 34 and second 38 lower side members are provided. Each of the lower side members 34, 38, has anterior 42 and posterior 46 ends and is pivotally mounted adjacent the anterior ends 42 to the first 14 and second 18 mounting brackets, respectively. A ground wheel 50 is provided. The ground wheel 50 is rotatably mounted adjacent the posterior ends 46 of the first 34 and second 38 lower side members. First 54 and second 58 upper side members are provided. Each of the upper side members 54, 58 has leading 62 and trailing 66 ends and is pivotally mounted adjacent the leading ends 62 to the first 14 and second 18 mounting brackets and fixedly attached adjacent the anterior ends 42 of the first 34 and second 38 lower side members.

Figure 1:
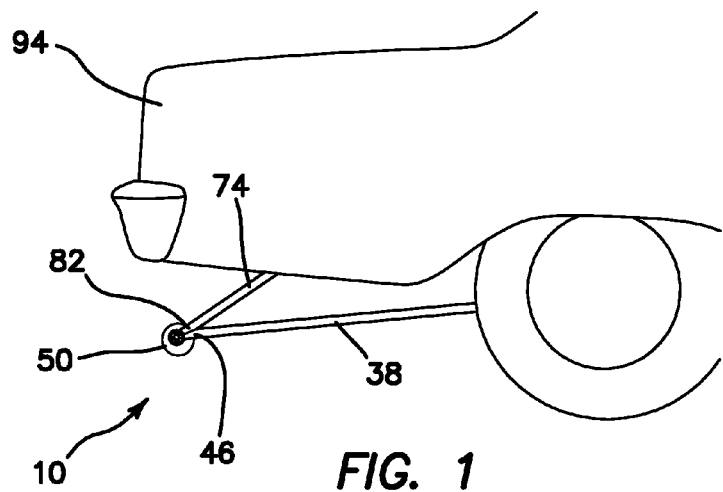
FIG. 1 is a side elevational view of the preferred embodiment of the invention attached to a car.

A vehicle bearing wheel 70 is provided. The bearing wheel 70 is rotatably mounted adjacent the trailing ends 66 of the first 54 and second 58 upper side members. A rear support member 74 is provided. The support member 74 has a forward end 78 and a back end 82. The support member 74 is fixedly attached adjacent the forward end 78 adjacent the trailing ends 66 of the first 54 and second 58 upper side members. The support member 74 is fixedly attached adjacent the back end 82 adjacent the posterior ends 46 of the first 34 and second 38 lower side members. At least one elevating facility 86 is provided. The facility 86 urges the wheelie bar 10 upwardly toward an underside 30 of a car. The attachment points 22 are fixedly attached to an axle housing 90 of the car 94.

Figure 3:
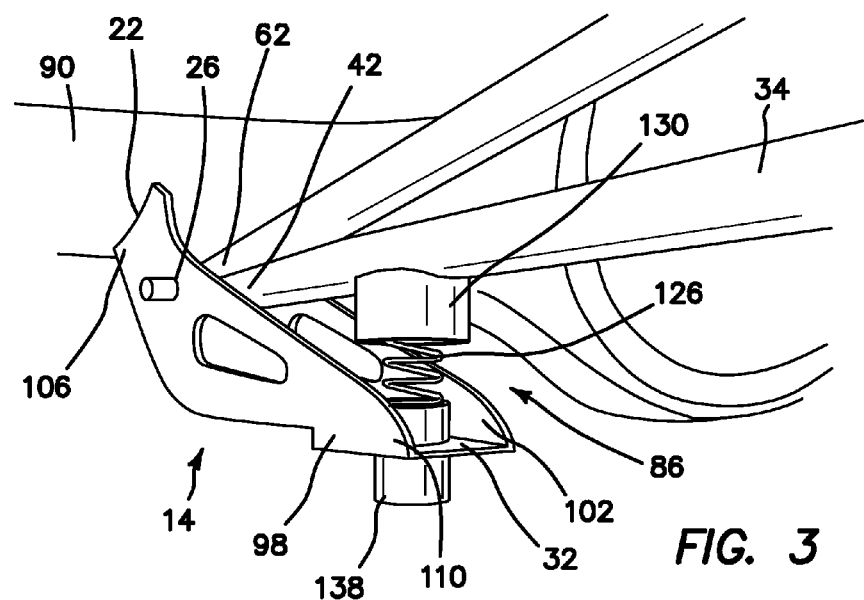
FIG. 3 is a perspective close-up view of a mounting bracket of the FIG. 1 embodiment.

(2) In a variant of the invention, as illustrated in FIG. 3, the first 14 and second 18 mounting brackets further include first 98 and second 102 parallel side plates. Each of the side plates 98, 102 has a front end 106 and a rear end 110, one of the attachment points 22 is located adjacent the front end 106 and one of the bearing feature 26 is spaced from the attachment point 22.

Figure 4:
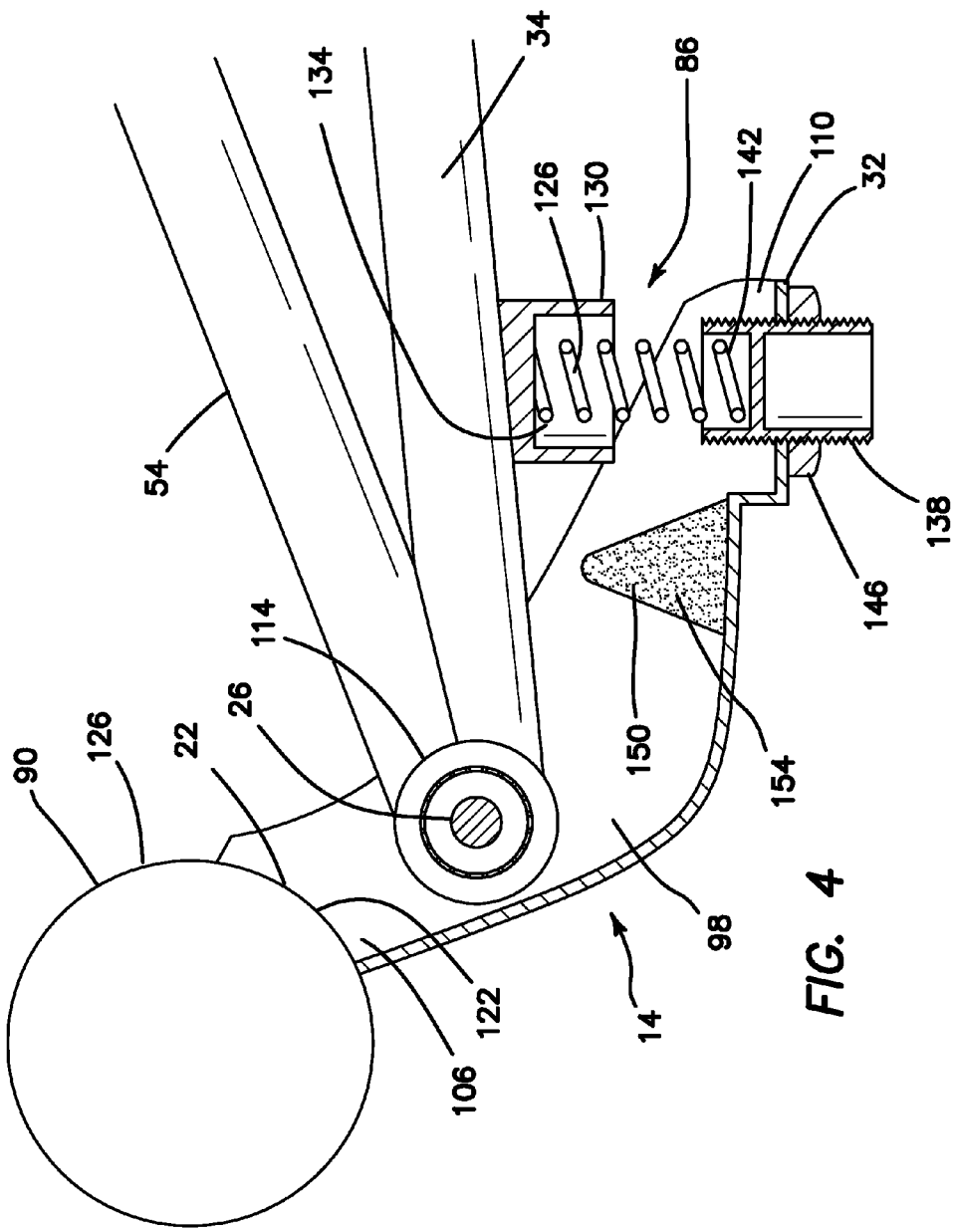
FIG. 4 is a side elavational, partial cross-sectional view of the FIG. 3 mounting bracket and elevating facility.

(3) In another variant, as illustrated in FIGS. 3 and 4, at least one elevating facility mounting 32 is provided. The mounting 32 is fixedly joined to at least one of the side plates 98, 102 adjacent the rear end 110.

(4) In still another variant, as illustrated in FIG. 4, first 114 and second (not shown) bearings are mounted to the bearing features 26 of the first 98 and second 102 parallel side plates.

(5) In yet another variant, the at least one attachment point 22 has an arcuate shape 122. The shape 122 corresponds to a shape of an exterior surface 126 of the axle housing 90 of the car 94.

(6) In a further another variant, the at least one attachment point 22 is attached to axle housing 90 of the car 94 by welding.

(7) In still a further variant, as illustrated in FIGS. 3 and 4, the elevating facility 86 further includes a coil spring 126. The coil spring 126 is located between the elevating facility mounting 32 and at least one of the first 34 and second 38 lower side members.

(8) In yet a further variant, the elevating facility 86 further includes a coil spring receiver 130. The receiver 130 is fixedly attached to at least one of the first 34 and second 38 lower side members and is sized and shaped to at least partially surround an upper end 134 of the coil spring 126.

(9) In another variant of the invention, the elevating facility 86 further includes a coil spring seat 138. The seat 138 is attached to the elevating facility mounting 30 and is sized and shaped to at least partially surround a lower end 142 of the coil spring 126.

(10) In still another variant of the invention, the seat 138 is adjustably attached to the elevating facility mounting 32, thereby controlling tension on the coil spring 126.

(11) In yet another variant, as illustrated in FIG. 4, the seat 138 is threadedly attached to the elevating facility mounting 32 and secured with a locking fastener 146.

Figure 5:
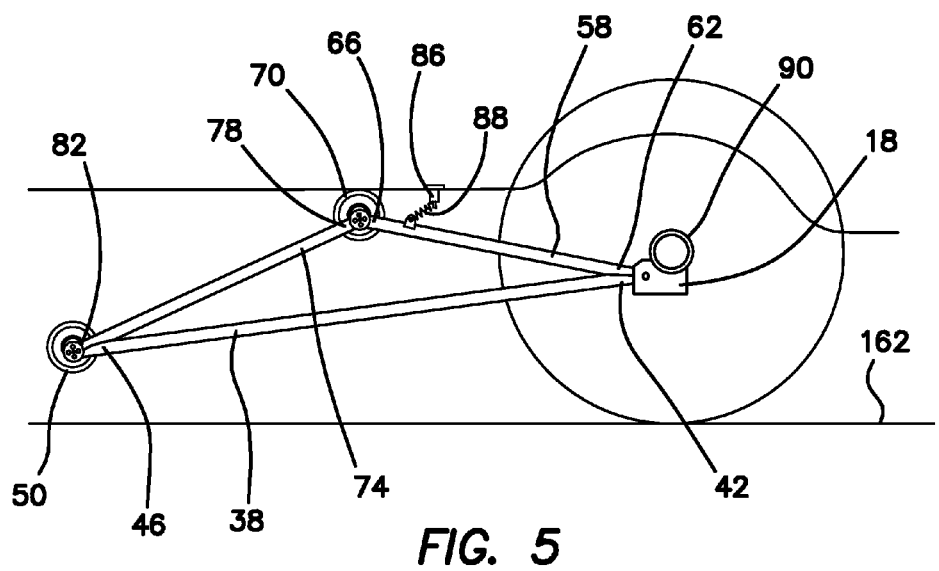
FIG. 5 is a side elavational view of the FIG. 1 embodiment with an alternative elevating facility.

(12) In a further variant, as illustrated in FIG. 5, elevating facility 86 further includes an elastic member 88. The elastic member 88 is located between the underside 30 of the car 94 and at least one of the first 54 and second 58 upper side members.

(13) In yet a further variant, as illustrated in FIGS. 3 and 4, a shock absorber 150 is provided. The shock absorber 150 is located between at least one of the first 14 and second 18 mounting brackets and at least one of the first 34 and second 38 lower side members.

(14) In still a further variant, the shock absorber 150 is formed of resilient material 154.

Figure 2:
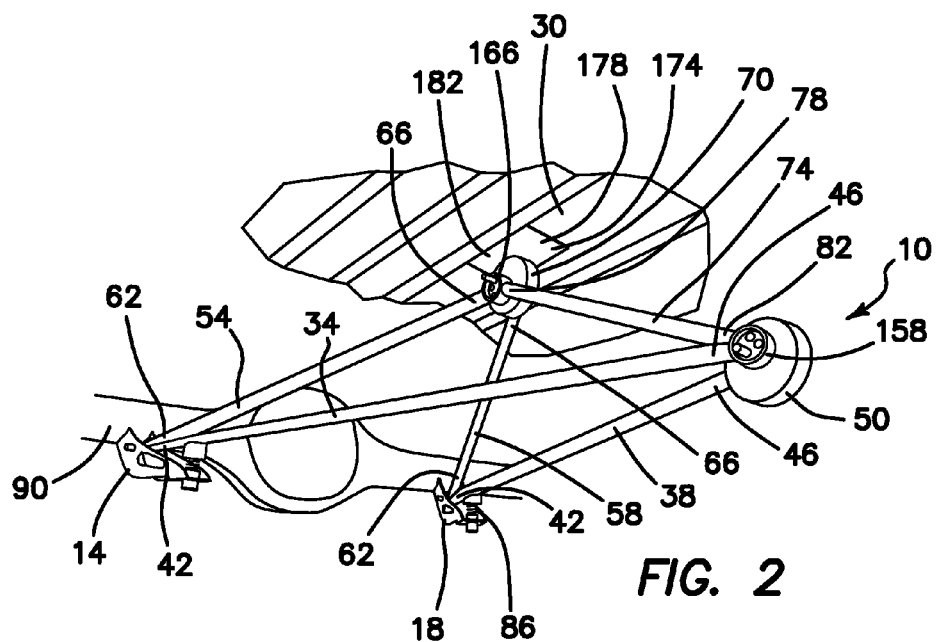
FIG. 2 is a perspective view of the FIG. 1 embodiment attached to a differential housing of the car.

(15) In another variant, as illustrated in FIG. 2, the ground wheel 50 is rotatably mounted adjacent the posterior ends 46 of the first 34 and second 38 lower side members and the back end 82 of the rear support member 74 with a bearing 158. The bearing 158 reduces friction as the ground wheel 50 contacts a ground surface 162.

(16) In yet a further variant, the vehicle bearing wheel 70 is rotatably mounted adjacent the trailing ends 66 of the first 54 and second 58 upper side members and the forward end 78 of the rear support member 74 with a bearing 166. The bearing 166 reduces friction as the vehicle bearing wheel 70 contacts an underside 30 of the car 94.

(17) In still another variant of the invention, a reinforcing plate 174 is provided. The reinforcing plate 174 is formed of semi-rigid material 178 and is sized shaped and located to provide a bearing surface 182 between the vehicle bearing wheel 70 and the underside 30 of the car 94.

(18) In a final variant, the reinforcing plate 174 is formed of material selected from the group that includes steel, brass, aluminum, plastic, rubber and leather.

The wheelie bars for leaf spring equipped cars 10 have been described with reference to particular embodiments. Other modifications and enhancements can be made without departing from the spirit and scope of the claims that follow.

The invention claimed is:

1. A wheelie bar for leaf spring equipped cars comprising:
first and second mounting brackets, each of said brackets having at least one attachment point and at least one bearing feature;
first and second lower side members, each of said lower side members, having anterior and posterior ends and being pivotally mounted adjacent said anterior ends to said first and second mounting brackets, respectively;
a ground wheel, said ground wheel being rotatably mounted adjacent said posterior ends of said first and second lower side members;
first and second upper side members, each of said upper side members having leading and trailing ends and being pivotally mounted adjacent said leading ends to said first and second mounting brackets and fixedly attached adjacent said anterior ends of said first and second lower side members;
a vehicle bearing wheel, said bearing wheel being rotatably mounted adjacent said trailing ends of said first and second upper side members;
a rear support member, said support member having a forward end and a back end and being fixedly attached adjacent said forward end adjacent said trailing ends of said first and second upper side members and fixedly attached adjacent said back end adjacent said posterior ends of said first and second lower side members;
at least one elevating facility, said facility urging said wheelie bar upwardly toward an underside of a car; and
said attachment points being fixedly attached to an axle housing of said car.

2. The wheelie bar for leaf spring equipped cars, as described in claim 1, wherein said first and second mounting brackets further comprise:
first and second parallel side plates, each of said side plates having a front end and a rear end; and
one of said attachment points being disposed adjacent said front end and one of said bearing feature being spaced from said attachment point.

3. The wheelie bar for leaf spring equipped cars, as described in claim 2, further comprising at least one elevating facility mounting, said mounting being fixedly joined to at least one of said side plates adjacent said rear end.

4. The wheelie bar for leaf spring equipped cars, as described in claim 2, further comprising first and second bearings mounted to said bearing features of said first and second parallel side plates.

5. The wheelie bar for leaf spring equipped cars, as described in claim 1, wherein said at least one attachment point has an arcuate shape, said shape corresponding to a shape of an exterior surface of said axle housing of said car.

6. The wheelie bar for leaf spring equipped cars, as described in claim 1, wherein said at least one attachment point is attached to said axle housing of said car by welding.

7. The wheelie bar for leaf spring equipped cars, as described in claim 3, wherein said elevating facility further comprises a coil spring, said coil spring being disposed between said elevating facility mounting and at least one of said first and second lower side members.

8. The wheelie bar for leaf spring equipped cars, as described in claim 7, wherein said elevating facility further comprises a coil spring receiver, said receiver being fixedly attached to at least one of said first and second lower side members and being sized and shaped to at least partially surround an upper end of said coil spring.

9. The wheelie bar for leaf spring equipped cars, as described in claim 7, wherein said elevating facility further comprises a coil spring seat, said seat being attached to said elevating facility mounting and being sized and shaped to at least partially surround a lower end of said coil spring.

10. The wheelie bar for leaf spring equipped cars, as described in claim 9, wherein said seat is adjustably attached to said elevating facility mounting, thereby controlling tension on said coil spring.

11. The wheelie bar for leaf spring equipped cars, as described in claim 10, wherein said seat is threadedly attached to said elevating facility mounting and secured with a locking fastener.

12. The wheelie bar for leaf spring equipped cars, as described in claim 1, wherein said elevating facility further comprises an elastic member, said elastic member being disposed between said underside of said car and at least one of said first and second upper side members.

13. The wheelie bar for leaf spring equipped cars, as described in claim 1, further comprising a shock absorber, said shock absorber being disposed between at least one of said first and second mounting brackets and at least one of said first and second lower side members.

14. The wheelie bar for leaf spring equipped cars, as described in claim 13, wherein said shock absorber is formed of resilient material.

15. The wheelie bar for leaf spring equipped cars, as described in claim 1, wherein said ground wheel is rotatably mounted adjacent said posterior ends of said first and second lower side members and said back end of said rear support member with a bearing, said bearing reducing friction as said ground wheel contacts a ground surface.

16. The wheelie bar for leaf spring equipped cars, as described in claim 1, wherein said vehicle bearing wheel is rotatably mounted adjacent said trailing ends of said first and second upper side members and said forward end of said rear support member with a bearing, said bearing reducing friction as said vehicle bearing wheel contacts said underside of said car.

17. The wheelie bar for leaf spring equipped cars, as described in claim 1, further comprising a reinforcing plate, said reinforcing plate being formed of semi-rigid material and being sized shaped and disposed to provide a bearing surface between said vehicle bearing wheel and said underside of said car.

18. The wheelie bar for leaf spring equipped cars, as described in claim 17, wherein said reinforcing plate is formed of material selected from the group comprising:

steel, brass, aluminum, plastic, rubber and leather.

* * * * *